Feb. 2, 1965
R. L. RORSCHACH
3,167,929
JET PUMP ABSORPTION REFRIGERATION
Filed Nov. 30, 1962
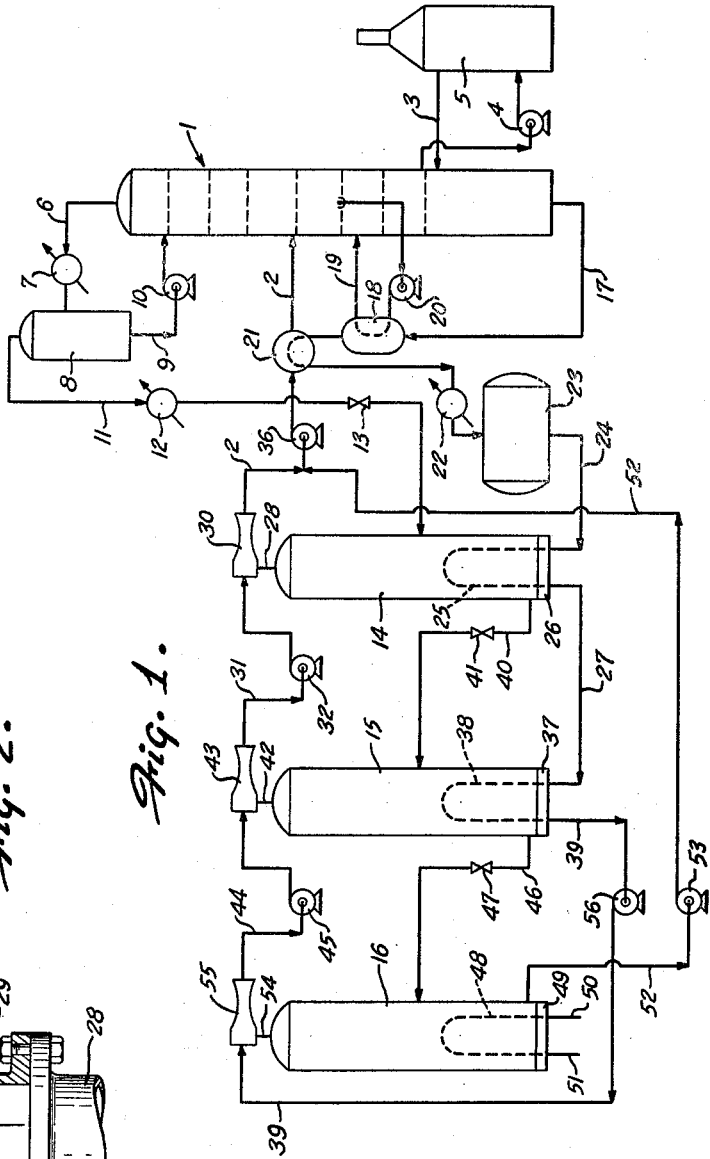
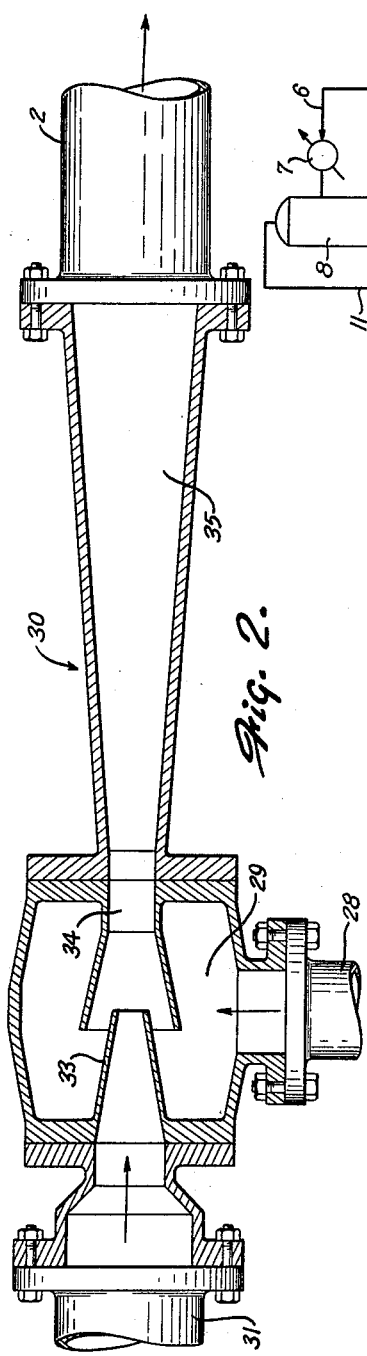
INVENTOR.
ROBERT L. RORSCHACH
BY
Andrus & Starke
ATTORNEYS

3,167,929
JET PUMP ABSORPTION REFRIGERATION
Robert L. Rorschach, 3611 S. Braden Place, Tulsa, Okla.
Filed Nov. 30, 1962, Ser. No. 241,363
7 Claims. (Cl. 62—101)

This invention relates to an absorption process and more particularly to an absorption refrigeration process having improved efficiency in design to provide low temperature heat removal.

Low temperature refrigeration has particular application in chemical industries, natural gasoline plants and oil refineries where it is desired to recover, separate or purify gases or other materials. For example, ethane and other lighter materials are extracted by low temperature fractionation, and low temperature refrigeration is a most effective low cost method of removing and recovering hydrogen sulfide from gas streams. In addition, low temperature refrigeration is useful in recovery of valuable waste products in oil refineries, the polymerization of unsaturates in the chemical industry, freeze hydration of foods and air conditioning.

In a conventional low temperature absorption refrigeration process employing inert gas, there are two basic areas or functions, the cold end where ultimate refrigeration takes place, and the hot end where the refrigerant is separated from the absorbent. In the cold end the cold refrigerant, which is a low boiling point liquid such as propane, Freon, ammonia and the like, is circulated from a stripper through a chiller or heat exchanger to chill a material passing through the chiller. The warmed refrigerant is then returned to the stripper and a portion of this stream of refrigerant is vaporized as it passes down the stripper in counter current flow to an inert gas. The inert gas is employed in the stripper to effect a reduction in the partial vapor pressure of the refrigerant causing it to boil at a lower temperature with the resulting heat of vaporization capacity for absorbing heat occurring at a lower temperature.

The refrigerant vapor and inert gas then flow through an absorber and counter currently to a cool absorbent liquid. The absorbent serves to absorb the refrigerant vapor to provide an enriched absorbent liquid. The inert gas is recirculated to the stripper while the enriched absorbent flows to a generator or fractionator which is essentially a pressurized tower where the enriched absorbent is volatilized with the differential in volatility between the refrigerant and the absorbent allowing the collection of the refrigerant at the top of the tower and the absorbent at the bottom of the tower. The pure refrigerant is then flowed from the fractionator back to the stripper while the pure or lean absorbent is returned to the absorber.

One of the problems in an inert gas absorption refrigeration system such as this is that the presence of the inert gas in the absorber lessens the ability of the absorbent to absorb refrigerant vapors. Therefore, a greater quantity of absorbent must be circulated through the absorber to dissolve a given amount of refrigerant vapor if inert gas is present, and thus the efficiency of an absorption refrigeration cycle operating at fixed temperature levels is largely a function of the absorbent circulation rate.

The present invention is directed to an absorption refrigeration process having improved efficiency and which reduces the quantity of refrigerant and absorbent required to be circulated in the system.

According to the invention the refrigerant is evaporated in the refrigeration evaporator at the cold end of the system and serves to chill an outside medium. The refrigerant vapor is drawn from the refrigeration evaporator by the eductor action produced by pure absorbent passing through a jet pump or ejector, and the refrigerant vapor is absorbed in the absorbent liquid to enrich the same. The enriched absorbent is moved to the fractionator or hot end and passes through a series of jet pumps which are associated with heat exchange units. In each heat exchange unit, lean or pure absorbent moving from the hot end to the cold end is passed in heat conductive relation with pure refrigerant liquid which is also moving from the hot end to the cold end. A portion of the refrigerant liquid is vaporized in each heat exchange unit and the refrigerant vapor is drawn from the unit by the driving force of the enriched absorbent passing through the respective jet pump. The refrigerant vapor being drawn from the heat exchange unit is absorbed in the enriched absorbent to further enrich the same.

Thus, the enriched absorbent passing from the refrigeration evaporator to the fractionator is progressively enriched by the absorption of the refrigerant vapor at each heat exchange unit. In addition, pure separated absorbent which is moving from the fractionator or hot end to the refrigeration evaporator or cold end is reduced in temperature in each heat exchange unit. This results in increased efficiency for it substantially reduces the flow rate of the absorbent which is necessary to absorb the refrigerant vapor in the absorption process.

The use of the ejector or jet pump substantially reduces the cost of equipment necessary to achieve the absorption and reduces the quantity of refrigerant and absorbent which is needed to be circulated within the system.

The jet pumps or ejectors also aid in increasing the pressure of the enriched absorbent as it moves from the cold end to the hot end. The increase in pressure increases the absorbing capacity of the absorbent at each stage and reduces the number of stages required from the cold end to the hot end.

The present absorption system eliminates the need for low temperature mechanical refrigeration equipment which is difficult to operate with a high degree of continuity and also lowers the labor cost since operator attendance is not required with the absorption system. Furthermore, the absorption system is capable of using low level waste heat where it is available as a cheap source of energy to operate the system.

Furthermore, leakage problems are minimized in the system for there is no compressor packing leakage problem which is a common source of difficulty in conventional mechanical refrigeration units. In addition, there is very little wear of the equipment for there are few rotating parts and as corrosion is absent, maintenance and component replacement costs are negligible.

The control of the absorption refrigeration system of the invention from the refrigeration load of zero to full capacity is continuous and smooth and not stepwise as in most other systems. Moreover, vibration, a costly and dangerous factor associated with compression-type refrigerator units, is absent in the system of the invention.

The low temperatures can be obtained with the present system with or without cascade or multi-refrigerant systems. For example, the process can easily withdraw heat at $-100°$ F. and reject at atmospheric temperature with a single refrigerant cycle.

Other objects and advantages will appear in the course of the following description.

The drawings illustrate the best mode presently contemplated for carrying out the invention.

In the drawings:

FIG. 1 is a flow sheet showing the absorption refrigeration system of the invention; and FIG. 2 is an enlarged sectional view showing the details of the ejector.

The flow sheet illustrates an absorption system and includes a fractionator 1 which is of conventional design and is essentially a pressurized tower where the enriched absorbent is heated to volatilize and separate the refrigerant vapor from the absorbent. The refrigerant to be used in the system is any low boiling point liquid, such as methane, ethane, propane, Freon, ammonia and the like, which is capable of being absorbed in the liquid absorbent. The absorbent may take the form of hexane, pentane, water and the like.

The enriched absorbent is introduced into the central portion of the fractionator 1 through line 2 and flashes, the liquid passing downwardly within the fractionator in countercurrent flow with the refrigerant vapor moving upwardly within the tower. The bottom liquid is heated by circulating all or part of the liquid through line 3 by pump 4 in contact with a suitable heat source such as reboiler 5. Reboiling of the bottom liquid can be done in any convenient manner, such as direct gas fire heating, steam, electric heating and the like. Heating of the bottom liquid causes the refrigerant to volatilize and the refrigerant vapor passes upwardly through the series of trays in the fractionator and is discharged from the upper end of fractionator 1 through line 6 to reflux condenser 7 and surge tank 8. A portion of the condensed refrigerant is returned to the fractionator through line 9 by pump 10 and is refluxed, while a second portion of the condensed refrigerant is withdrawn from tank 8 through line 11 and passed through a water cooled heat exchanger 12. The condensed refrigerant is expanded through valve 13 into the first of a series of heat exchanger units 14 and 15 and is subsequently expended into a refrigeration evaporator 16 where ultimate chilling of an outside medium takes place.

The pure absorbent is collected in the bottom of the fractionator 1 and is withdrawn from the fractionator through line 17. The pure absorbent in line 17 is cooled by passing through heat exchanger 18 in heat transfer relation with refrigerant-absorbent mixture being circulated through line 19 by pump 20. The pure absorbent in line 17 is further cooled by passing through heat exchanger 21 in heat conductive relation with the enriched absorbent in line 2 and by passing through water cooled heat exchanger 22. The liquid absorbent at cooling water temperature and elevated pressure is collected in surge tank 23 and subsequently flows through line 24 to the heat exchanger unit 14 where the pure absorbent is passed in heat conductive relation with the refrigerant entering unit 14 through line 11. As shown in the flow sheet, the heat exchanger 14 includes a tube bundle 25 which consists of a series of U-shaped tubes, the ends of which are connected to a header 26. The line 24 is connected to the inlet side of the header 26 so that pure absorbent flows within the tubes and returns to the outlet side of the header where it is discharged from the unit 14 through line 27 and is subsequently introduced into the next heat exchanger 15.

The pure refrigerant liquid boils around the tube bundle 25 thereby cooling the absorbent within the tube bundle at a temperature dependent upon the total pressure of the tower. There is no inert gas present in the unit 14. The refrigerant vapor rises upwardly in the heat exchanger tower and is discharged through an outlet conduit 28. The outlet conduit 28 is connected to the suction chamber 29 of a jet pump 30 or ejector which is located in the line 2.

The enriched absorbent being returned to the fractionator is pumped through line 31 by pump 32 and enters the jet pump 30 through inlet nozzle 33 which converts the fluid pressure into a high velocity jet stream. The increase in velocity of the stream of enriched absorbent results in a pressure decrease which draws the refrigerant vapor into suction chamber 29 and the vapor is mixed and absorbed in the jet stream of absorbent emerging from the nozzle 33 to further enrich the absorbent. The enriched absorbent then passes through the throat 34 or venturi of the jet pump and into the diffuser section 35 where the velocity of the enriched absorbent is converted to a pressure greater than the suction pressure. Thus the refrigerant vapor is removed from the heat exchanger unit 14 and absorbed in the enriched absorbent by the jet pump 30. The further enriched absorbent emerging from jet pump 30 is pumped back to the fractionator by pump 36 in line 2.

The pure absorbent discharged from heat exchanger 14 through line 27 is introduced into the second heat exchanger 15, which is similar to heat exchanger 14. Line 27 is connected to the inlet side of a header 37 associated with tube bundle 38 so that absorbent flows within the tubes and returns to the outlet side of the header where it is discharged through line 39. Refrigerant liquid is withdrawn from heat exchanger 14 through line 40, expanded through valve 41 and introduced into the second heat exchanger 15. Heat is transferred from the absorbent in tube bundle 38 to the refrigerant, causing the refrigerant to boil and vaporize. The refrigerant vapor rises upwardly through heat exchanger 15 and passes through outlet line 42 to the suction chamber of jet pump 43. Jet pump 43 is identical in structure and function to jet pump 30. Enriched absorbent returning from the cold end to the hot end is pumped through line 44 by pump 45 and enters the jet pump 43 through the inlet nozzle to thereby increase the velocity of the stream of enriched absorbent. The refrigerant vapor is drawn into the jet stream of enriched absorbent and absorbed therein to further enrich the same. The absorbent then passes through line 31 to jet pump 30, as previously described.

The refrigerant liquid is withdrawn from heat exchanger 15 through line 46, expanded through valve 47 and introduced into refrigeration evaporator 16. The refrigerant vaporizes in refrigeration evaporator 16 and serves to cool or chill a medium flowing within tube bundle 48 in the lower end of the refrigeration evaporator. The medium to be chilled is introduced into the inlet side of header 49 through line 50 and flows through the generally U-shaped tubes which make up the tube bundle and is discharged from the header through line 51.

The cold refrigerant liquid is returned to the fractionator or hot end through line 52 which is connected to line 2. A pump 53 is located in line 52 and serves to move the refrigerant liquid to the fractionator.

Refrigerant vapor within refrigeration evaporator 16 rises upwardly and is drawn through line 54 to jet pump 55 which is similar to jet pumps 30 and 43. Pure absorbent is pumped from heat exchanger 15 through line 39 by pump 56 and enters the inlet nozzle of jet pump 55 to thereby increase the velocity of the jet stream of the pure absorbent and provide a pressure decrease to draw the refrigerant vapor into the stream of absorbent. The refrigerant vapor is mixed with and absorbed in the absorbent to enrich the absorbent and the enriched absorbent then passes to jet pumps 43 and 30 where the absorbent is further enriched at each step.

With this system liquid refrigerant expands at elevated pressure in successive stages in heat exchangers 14, 15 and refrigeration evaporator 16 with ultimate chilling of an outside medium occurring in refrigeration evaporator 16. The refrigerant vapors generated in refrigeration evaporator 16 are drawn into the jet pump 55 and mixed and absorbed in the jet stream of pure absorbent. The resulting enriched absorbent is discharged from jet pump 55 at an intermediate pressure to the suction side of pump 45. By eductor action in jet pump 43, high pressure enriched absorbent from the pressure side of pump 45 draws and absorbs refrigerant vapor from heat exchanger 15 to further enrich the enriched absorbent and the further enriched absorbent is discharged at a higher intermediate pressure into the suction side of pump 32.

High pressure enriched absorbent from the pressure side of pump 32 is introduced to jet pump 30 where it serves as the driving force to draw refrigerant vapor from heat exchanger 14 and the refrigerant vapor is absorbed in the enriched absorbent to further enrich the same. The enriched absorbent is discharged from jet pump 30 at a still higher intermediate pressure and is driven by pump 36 to the fractionator 1.

With the system of the invention, the pure refrigerant moving from the hot end or fractionator 1 to the cold end or refrigeration evaporator 16 has its temperature progressively lowered in each heat exchanger 14 and 15, and similarly the pure absorbent moving from the hot end to the cold end has its temperature progressively lowered so that it emerges at a low temperature to be introduced into the jet pump or ejector 55. This results in increased efficiency in the absorption process for the lower absorbent temperature reduces the flow rate or quantity of absorbent necessary to absorb a given volume of refrigerant vapor.

The use of the jet pumps provides a simple and inexpensive structure for absorbing refrigerant vapor in the absorbent and eliminates the conventional absorption towers. The jet pumps also act in conjunction with the pumps 32, 36 and 45 to increase the pressure of the enriched absorbent as it moves to the hot end or fractionator. This reduces the number of pressure stages required to bring the enriched absorbent to fractionator pressure and also increases the absorption capacity of the enriched absorbent at each heat exchanger.

While the description has been directed to the use of two heat exchangers 14 and 15 it is contemplated that any number of heat exchangers can be used depending on the particular absorbent and refrigerant used and depending on the desired cooling capacity of the system.

Various modes of carrying out the invention are contemplated as being within the scope of the following claims particularly pointing out and distinctly claiming the subject matter which is regarded as the invention.

I claim:

1. In an absorption refrigeration system, a fractionator adapted to volatilize enriched absorbent and separate the refrigerant from the absorbent, a refrigeration evaporator unit wherein liquid refrigerant is vaporized to chill an outside medium, an ejector having a suction side communicating with the said refrigeration evaporator unit, first conduit means connecting the fractionator to said ejector for conducting substantially pure absorbent from the fractionator to the pressure inlet of said ejector, second conduit means connecting the pressure outlet of said ejector to the fractionator for conducting enriched absorbent to the fractionator, third conduit means connecting the fractionator to the refrigeration evaporator unit for conducting liquid refrigerant from the fractionator to the refrigeration evaporator unit, heat transfer means connected to said first conduit means and said third conduit means for transferring heat from substantially pure absorbent in said first conduit means to the liquid refrigerant in said third conduit means to thereby cool the absorbent and partially vaporize the refrigerant, and means connecting said heat transfer means and said second conduit means for absorbing the refrigerant vapor in said enriched absorbent to further enrich the same.

2. In an absorption system, fractionator means for heating enriched absorbent to volatilize and separate refrigerant from the absorbent, evaporator means for evaporating refrigerant to chill an outside medium, first conduit means connected to the fractionator means for conducting pure absorbent from said fractionator means to said evaporator and for returning absorbent to the fractionator means, second conduit means connecting the fractionator means and the evaporator means for conducting liquid refrigerant from the fractionator means to the evaporator means, heat exchanger means connected to said first and second conduit means for transferring heat from absorbent flowing in said first conduit to refrigerant liquid in said second conduit means to vaporize said refrigerant, a first ejector disposed in said first conduit means, and having a suction side communicating with said evaporator means, the absorbent being passed through said ejector as a high velocity stream to thereby draw the refrigerant vapor from said evaporator means into said stream and absorb the refrigerant in the absorbent to enrich said absorbent, and a second ejector disposed in said first conduit means between said first ejector and said fractionator means, said second ejector having a suction side communicating with the heat exchanger means, said enriched absorbent being ejected by said second ejector to thereby draw the refrigerant vapor from said heat exchanger means into said second ejector to absorb the refrigerant vapor in said enriched absorbent to further enrich the same.

3. In an absorption process having a hot section to separate the refrigerant from the absorbent, and having a cold section to chill an outside medium, the steps of passing substantially pure absorbent flowing from the hot section to the cold section into heat conducting relation with substantially pure refrigerant liquid discharged from the hot section to thereby transfer heat from the absorbent to the refrigerant and cool the absorbent and partially vaporize the refrigerant, ejecting absorbent flowing from the cold section to the hot section, and drawing said refrigerant vapor into the ejected absorbent to thereby absorb the refrigerant vapor in said ejected absorbent to enrich the same.

4. In an absorption process having a hot section to separate the refrigerant from the absorbent, and having a cold section to chill an outside medium, the steps of passing substantially pure absorbent from the hot section to the cold section, passing substantially pure refrigerant liquid from the hot section to the cold section, transferring heat from said absorbent moving from the hot section to the cold section to refrigerant liquid moving from the hot section to the cold section to partially vaporize the refrigerant, returning the absorbent from the cold section to the hot section, increasing the velocity of the absorbent along a portion of its length of travel from the cold section of the hot section, and drawing said refrigerant vapor into the stream of absorbent at the location of increased velocity to absorb the refrigerant vapor in said absorbent.

5. In an absorption process having a hot section to separate the refrigerant from the absorbent, and having a cold section to evaporate refrigerant and chill an outside medium, ejecting pure absorbent from the hot section to provide a high velocity stream of pure absorbent, drawing refrigerant vapor from the cold section into the ejected stream of absorbent to absorb refrigerant vapor in said absorbent and provide enriched absorbent, passing substantially pure absorbent flowing from the hot section to the cold section into heat conducting relation with substantially pure refrigerant liquid discharged from the hot section to thereby transfer heat from the absorbent to the refrigerant and cool the absorbent and partially vaporize the refrigerant, ejecting the enriched absorbent, drawing the last named refrigerant vapor into the enriched absorbent to absorb said last named refrigerant vapor in said enriched absorbent and further enrich the same, and flowing the further enriched absorbent to said hot section.

6. In an absorption refrigeration process having a fractionator to separate refrigerant from absorbent and having an evaporator for evaporating refrigerant to chill an outside medium, the steps of withdrawing substantially pure absorbent from the fractionator, withdrawing substantially pure refrigerant liquid from the fractionator, passing said absorbent in heat conducting relation with said refrigerant liquid to thereby transfer heat from the absorbent to the refrigerant to cool the absorbent and vaporize a portion of said refrigerant, passing partially enriched absorbent through an area of reduced cross sectional area to thereby increase the velocity of said partially enriched absorbent and decrease the pressure thereof, and drawing said refrigerant vapor into the stream of partially enriched absorbent at the location of decreased pressure to thereby absorb the refrigerant vapor in the partially enriched absorbent to further enrich the same and to aid in bringing pressure of said partially enriched absorbent to the fractionator pressure.

7. In an absorption refrigeration system, a fractionator adapted to volatilize enriched absorbent and separate the refrigerant from the absorbent, a refrigeration evaporator unit wherein liquid refrigerant is vaporized to chill an outside medium, an ejector having a suction side communicating with the said refrigeration evaporator unit, first conduit means connecting the fractionator to said ejector for conducting substantially pure absorbent from the fractionator to the pressure inlet of said ejector, second conduit means connecting the pressure outlet of said ejector to the fractionator for conducting enriched absorbent to the fractionator, third conduit means connecting the fractionator to the refrigeration evaporator unit for conducting liquid refrigerant from the fractionator to the refrigeration evaporator unit, heat transfer means connected to said first conduit means and said third conduit means for transferring heat from substantially pure absorbent in said first conduit means to the liquid refrigerant in said third conduit means to thereby cool the absorbent and partially vaporize the refrigerant, a second ejector connected in said second conduit means between said first ejector and said fractionator, said second ejector having a suction side communicating with the portion of the third conduit means connected in said heat transfer means whereby refrigerant vapor from said heat transfer means is drawn into said second ejector to absorb the refrigerant vapor in said enriched absorbent to further enrich the same, first pumping means located in said first conduit means for pumping liquid to said first ejector, and second pumping means located in said second conduit means between said said first and second ejectors for pumping enriched absorbent to the second ejector.

References Cited by the Examiner
UNITED STATES PATENTS

| | | | |
|---|---|---|---|
| 1,870,265 | 8/32 | Seligmann | 62—483 X |
| 1,882,255 | 10/32 | Randel | 62—111 X |
| 1,934,690 | 11/33 | Babcock | 62—483 |
| 1,953,993 | 4/34 | Smellie | 62—109 |
| 1,976,593 | 10/34 | Altenkirch | 62—111 |

FOREIGN PATENTS

| | | |
|---|---|---|
| 836,197 | 4/52 | Germany. |
| 137,975 | 1/20 | Great Britain. |

ROBERT A. O'LEARY, *Primary Examiner.*